Figure 3:
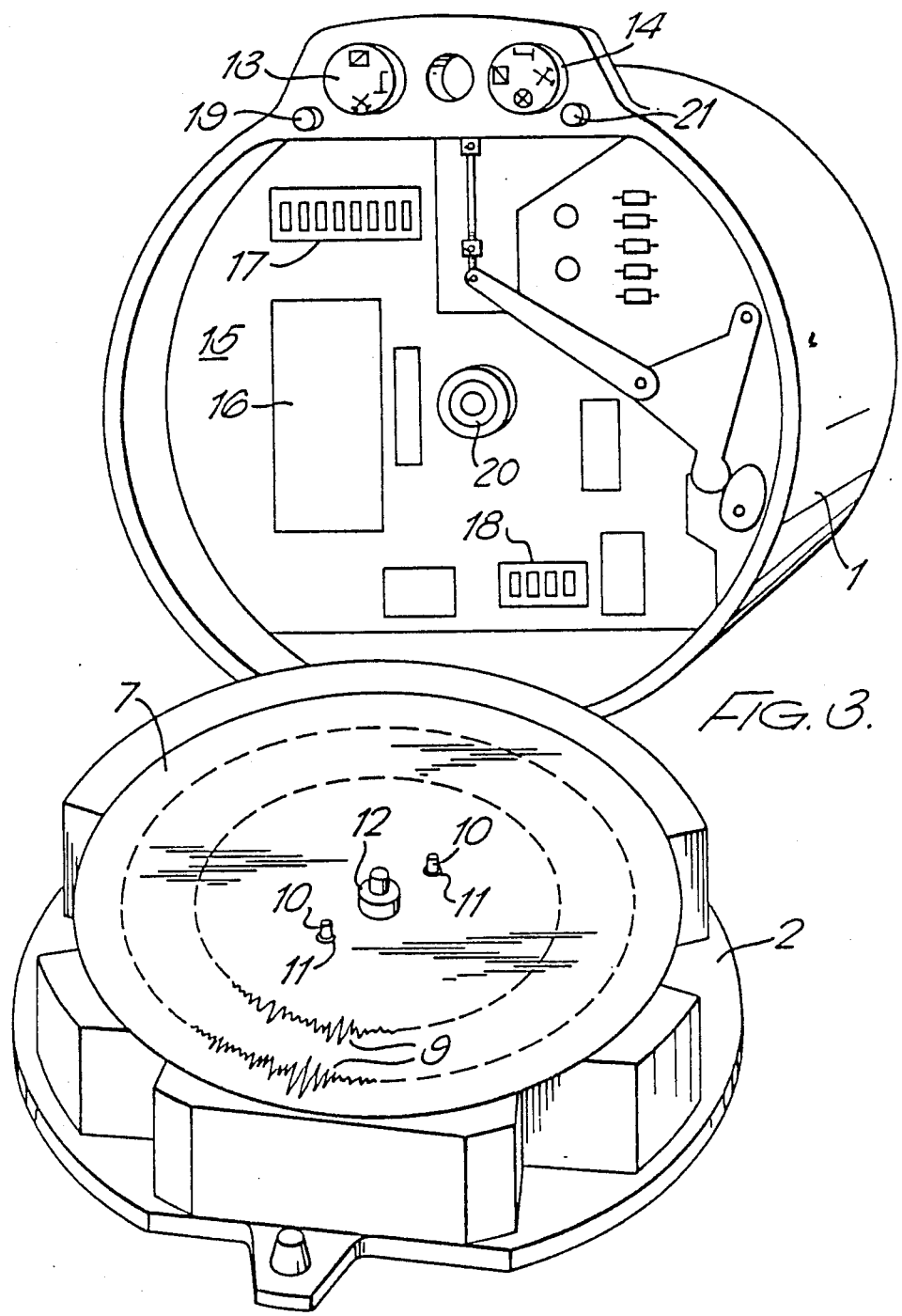

United States Patent [19]

Clish et al.

[11] Patent Number: 4,858,135
[45] Date of Patent: Aug. 15, 1989

[54] TACHOGRAPH AND VEHICLE SPEED CONTROL DEVICE

[75] Inventors: Frank Clish, Broughty Ferry; John B. Franklin, Inchture, both of Scotland

[73] Assignee: Veeder-Root Limited, Smethwick, England

[21] Appl. No.: 107,924

[22] Filed: Oct. 9, 1987

Related U.S. Application Data

[63] Continuation of Ser. No. 703,520, Feb. 20, 1985, abandoned.

[30] Foreign Application Priority Data

Feb. 24, 1984 [GB] United Kingdom ............ 8404888

[51] Int. Cl.⁴ .............................................. B60K 31/00
[52] U.S. Cl. ............................... 364/426.04; 180/170; 180/179; 123/352
[58] Field of Search ............... 364/424, 426, 561, 565, 364/431.07, 426.04; 340/62; 123/351, 352; 180/170, 176, 177, 179; 235/95 R; 324/166; 73/488, 490, 491, 495

[56] References Cited

U.S. PATENT DOCUMENTS

| | | |
|---|---|---|
| 3,716,700 | 2/1973 | Kelch et al. ...................... 364/561 |
| 4,074,196 | 2/1978 | Webster ............................. 324/166 |
| 4,374,422 | 2/1983 | O'Keefe, Jr. et al. ............. 364/426 |
| 4,380,799 | 4/1983 | Allard et al. .................... 364/426.04 |
| 4,467,428 | 8/1984 | Caldwell .......................... 364/426 |
| 4,535,865 | 8/1985 | Tanigawa et al. ................. 180/177 |
| 4,537,272 | 8/1985 | Tanigawa et al. ................. 180/176 |
| 4,540,060 | 9/1985 | Kawata et al. .................... 180/179 |
| 4,598,370 | 7/1986 | Nakajima et al. ................. 364/426 |

*Primary Examiner*—Gary Chin
*Attorney, Agent, or Firm*—Chilton, Alix & Van Kirk

[57] ABSTRACT

A tachograph comprises a casing (1,2) which houses a speed indicator (4), an odometer (6) and styli (8a, 8b) for respectively recording speed and distance travelled. A stepper motor (22) drives the speed indicator (4) and speed recording stylus (8a). A stepper motor (23) drives the odometer (6) and distance recording stylus (8b). A pulse generator (25) provides an input, proportional to vehicle speed, to a microprocessor (16) which computes speed and distance on the basis of the pulse input and a correction factor (26) relating to vehicle characteristics in order to drive the stepper motors (22,23). The microprocessor (16) is also responsive to a preset maximum top speed reference (27) and a driver selected top speed reference (28) to provide an output to an actuator (30) in order to control the vehicle speed.

6 Claims, 6 Drawing Sheets

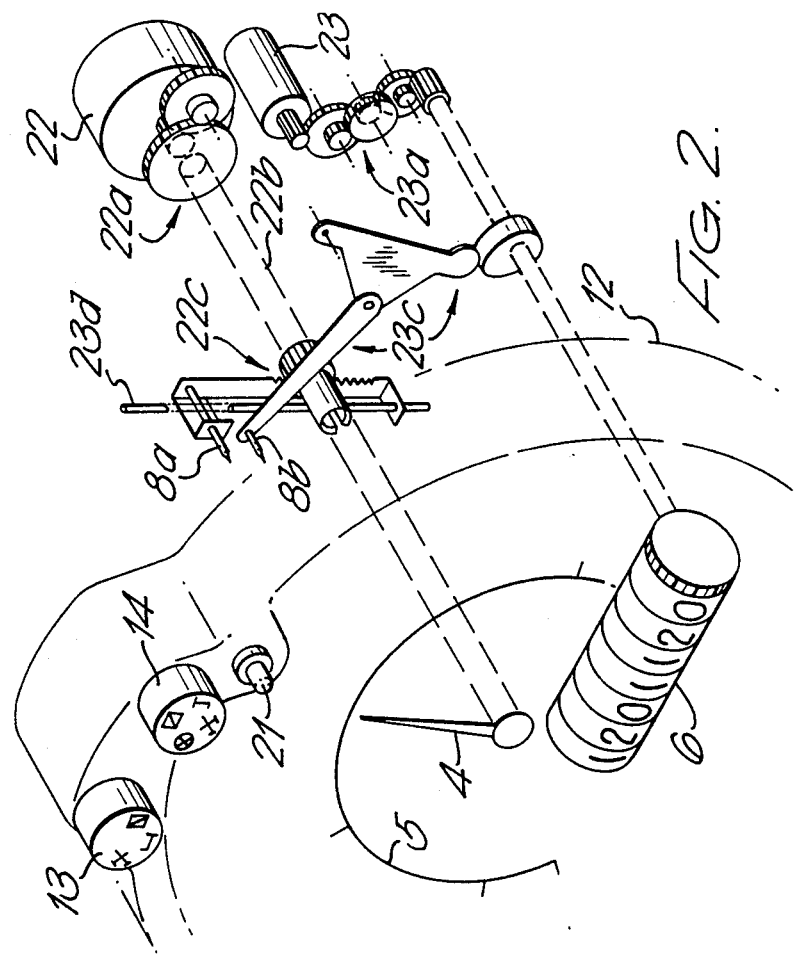
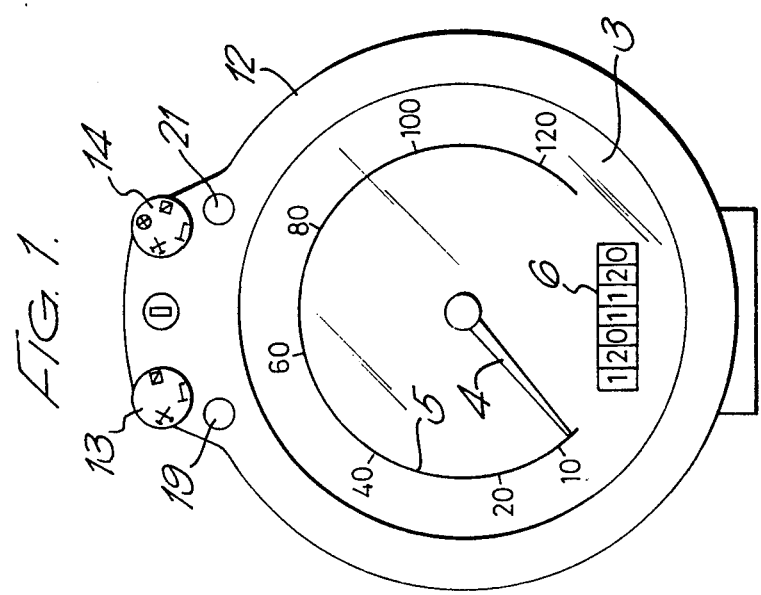

TACHOGRAPH AND VEHICLE SPEED CONTROL DEVICE

This is a continuation of co-pending application Ser. No. 703,520, filed on Feb. 20, 1985, now abandoned.

This invention relates to a tachograph and to a vehicle speed control device. In a preferred embodiment of the invention, a tachograph is fitted with a vehicle speed control device having an adjustable control for setting a maximum vehicle speed and another adjustable control for setting a selected vehicle speed which is less than the maximum vehicle speed.

Although vehicle speed control devices have been known for a long time, e.g. for more than some 10 years, they have usually been constructed and installed in vehicles as independent devices. Tachographs have been known for even longer, e.g. at least for some 40 years and these devices have also been constructed and installed, in similar types of vehicles, as independent devices. Where a vehicle is equipped with both devices, the driver needs separately to observe and to operate the speed control device and tachograph during his normal driving duties. For example, most modern tachographs are mounted within a casing which houses a speedometer having a speed indicating dial and the driver needs to observe his speed on the dial independently of viewing a speed control device, e.g. to operate the controls and/or to observe a vehicle speed display. Clearly, this is a disadvantage with regard to road safety. Moreover, some basic speed control devices may have a preset adjustment which enables the vehicle speed to be governed in respect of a maximum (e.g. legal) speed only, but which does not allow the driver to select a cruising speed less than the maximum legal speed. Unless the vehicle speed control device is equipped with some form of driver cruise control, the driver's attention may be further distracted by attempting to cruise at a speed which is close to the maximum speed.

It is also a disadvantage, from the point of view of cost, manufacture and installation, to provide separate devices in the same vehicle.

In attempting to solve the latter problems, one must deal with the problem of the overall size and capacity of a tachograph casing, as it is by no means a straight-forward matter to modify the functions performed by a modern tachograph. For example, the overall size of a tachograph must be kept small to facilitate installation in a vehicle normally in the position occupied by a speedometer, and the space within the tachograph casing is usually filled with various parts which are necessary to provide respective tachograph functions.

One aspect of the present invention seeks to provide a solution to the latter problems.

According to the latter aspect, a tachograph includes a casing; a tachograph chart drive within the casing; a visible vehicle speed indicator mounted on or within the casing; manually selectable controls accessible from the exterior of the casing for selecting driver duties to be recorded by the tachograph; means for recording said driver duties including vehicle speed and distance travelled by a vehicle; an input for receiving signal proportional to vehicle speed; a microprocessor mounted within the casing; an adjustable control mounted within the casing for setting a maximum vehicle speed and thereby providing a maximum speed reference, and an adjustable control accessible from the exterior of the casing to the maximum vehicle speed, thereby providing a driver selected top speed reference; said microprocessor being adapted to receive the signal proportional to vehicle speed, (a) to compare it with the maximum speed reference and the driver selected top speed reference and to produce an output to operate an actuator for controlling vehicle speed accordingly, and (b) to process it for causing said vehicle speed and distance travelled to be recorded by the tachograph.

Preferably, the adjustable control which enables the driver to set a top speed is one which, when actuated, co-operates with the microprocessor to set the top speed as an instantaneous value of vehicle speed. For example, the driver need only actuate a push button at a particular speed in order to set the driver selected top speed reference (which is below the maximum or legal limit), whereby the vehicle speed is limited by the set value.

Preferably, the microprocessor is programmed to scan the signal which is proportional to vehicle speed, the maximum speed reference and the driver selected top speed reference, in a periodic and sequential manner, so as to produce the output for controlling the vehicle speed, the scanning rate being sufficient to ensure smooth control.

Preferably, an alarm device (such as a warning light or audible alarm) is activated when the vehicle speed attains the top speed set by the driver so as to warn the driver that the preset top speed has been reached and cannot be exceeded. Such a warning device is conveniently mounted on, or within the tachograph casing to provide a self-contained unit.

Preferably, dual display and recording functions are provided by respective stepper motors. For example one stepper motor is employed to drive both display and recording mechanisms for vehicle speed. Another stepper motor similarly drives display and recording mechanisms for distance travelled by the vehicle. The use of stepper motors helps to conserve space. Moreover, stepper motors are readily controllable and capable of being monitored.

The display and recording functions may be implemented by means other than a stepper motor, e.g. by a servosystem which employs a DC motor coupled to a potentiometer and which is provided with feedback control.

Another problem experienced with vehicle speed control devices is one of "top speed overshoot". This problem is particularly noticeable when the weight of a vehicle changes, e.g. in the case of a fully laden commercial vehicle which is subsequently unloaded, or vice versa. If a speed control device fitted to the vehicle is adjusted to suit the characteristics of the vehicle when fully unloaded, the performance of the vehicle will be quite different after it has been fully loaded, (e.g. by as much as 30 tonnes) and vice versa. Similarly, if the same type of vehicle speed control device is fitted to different types of vehicles, the performance of the vehicles will be quite different. In both cases, the speed control device may attempt to govern the vehicle speed to a predetermined maximum limit, but the inertia of the vehicle may cause the maximum speed to be exceeded. This can happen, where, for example, an actuator is employed which is of the type that responds to the vehicle speed control signal in order to adjust a fuel control linkage. A "top speed overshoot" may therefore occur, despite attempts by the vehicle speed control device to govern the actual road speed of the vehicle.

A second aspect of the invention seeks to overcome these latter mentioned problems and to provide, at least in a preferred arrangement, a vehicle speed control device which is accurate without being unduly complex and expensive to manufacture.

According to the latter or second aspect of the invention, a vehicle speed control device comprises means to provide a preset speed reference, which relates to a predetermined vehicle speed limit; an input for receiving a signal proportional to vehicle speed; and control means which responds to the vehicle speed input signal and to the preset speed reference, whenever the vehicle speed either exceeds or is about to exceed the vehicle speed limit, and which performs a control function in order to provide an output for reducing the vehicle speed.

The control function which is performed by the control means may be either stepped, or continuous.

In the case where the vehicle overshoots the speed limit, the vehicle speed may be reduced until it has fallen either to, or just below the speed limit. In the case where the vehicle speed is likely to exceed the speed limit, (i.e. where an overshoot is predicted, but not experienced), the vehicle speed is ideally reduced so that it gradually approaches the speed limit. In either case and in practice, the vehicle may ultimately achieve a speed which varies slightly from the speed limit, e.g. by oscillating slightly about the speed limit, but such a vehicle speed can be considered as being substantially at the speed limit.

In the case where the vehicle speed overshoots the speed limit, the control means preferably performs a stepped function to cause a reduction in vehicle speed. One way for the control means to perform such a stepped control function is to employ a "floating" speed reference which is moved downwardly, step by step, each time the vehicle speed input signal is found to exceed the preset speed reference, i.e. for as long as a speed overshoot condition exists. For example, the preset speed reference is first stored (e.g. as a data value). The stored reference and the vehicle speed input signal are then continuously and sequentially scanned to determine (after each scan) whether or not the vehicle speed exceeds the speed limit. The stored reference is then decremented (e.g. by 1 km/hr) whenever the vehicle speed is found to exceed the speed limit. A particular advantage of this arrangement is that the speed reference can be learnt in practice (e.g. on each journey of the vehicle) to suit the individual characteristics of the vehicle (e.g. depending on whether or not it is laden).

Another way for the control means to perform a stepped control function is to employ an overshoot signal which is proportional to an excess speed, i.e. the amount by which the vehicle speed exceeds the preset speed reference and to use such an overshoot signal to reduce a "floating" speed reference by an amount proportional to the excess speed, and to make this reduction repeatedly until the excess speed has been substantially reduced or eliminated.

In the case where an overshoot is predicted, action must be taken in sufficient time to prevent an overshoot. One way of making the prediction is to determine vehicle acceleration at instantaneous vehicle speeds and to use such data to compute the time at which an overshoot is likely to occur. For example, the vehicle speed input signal may be derived from a transducer which provides a pulsed output in response to the speed of the transmission of the engine. The interval between consecutive pulses of such a pulsed signal can be used as a measure of vehicle speed and the difference between consecutive pulse intervals can be used as measure a of vehicle acceleration. A vehicle acceleration computed on the basis of the difference between consecutive pulse intervals at a given speed below the preset speed limit will be proportional to the interval of time required to reach the speed limit. Alternatively, the pulse frequency can be differentiated to compute vehicle acceleration, the relationship between computed vehicle acceleration and instantaneous vehicle speed (i.e. the speed of the vehicle when its acceleration was computed) being used to predict the time at which the vehicle speed is likely to reach the preset speed limit. In any such predictive arrangements, the predicted time to reach the preset speed limit can be continually computed and revised so that the control means executes its control function time to prevent an overshoot and so as to bring the vehicle speed smoothly to a point at, or closely adjacent the preset speed limit. This may be achieved, for example, by conditioning the control means to provide an output for reducing vehicle speed at a particular point in time which takes into account the response time (or time constant) of an actuator or mechanism fitted to the vehicle for physically adjusting or regulating (e.g.) means for controlling the supply of fuel to the engine of the vehicle (n.b. examples of such actuators or mechanisms are described below). Where the actuator has a fast response, the response time of the system is taken into account (i.e. to allow time for the speed reducing action to take effect). An advantageous form of control can be effected by causing the control means to produce its output at a point of time substantially coincident with, or just prior to, the beginning of an interval corresponding with the response time of the actuator or the system.

Thus, a form of proportional control can be achieved by anticipating when the vehicle is likely to exceed the preset speed limit and by controlling or limiting the vehicle speed in a smooth and optimum manner so that the vehicle speed approaches the preset speed limit asymptotically.

Generally speaking, various forms of actuator may be employed to reduce vehicle speed. For example, a d.c. motor may be used to provide a continuous (e.g. proportional) control function. Alternatively, a device may be employed to adjust the extent of a throttle linkage and this device could be used in either a continuous, or a stepped manner to effect a change in vehicle speed. More generally, the control means may be linked to a mechanism which regulates vehicle speed with a displacement, series of displacements, frequency, or duty cycle depending on the speed reduction required.

Preferably, a microprocessor is used to provide the required control function. In the case where an overshoot is predicted, the microprocessor may compute the time at which the preset speed limit would be reached on the basis of vehicle acceleration at a given instantaneous speed, or it may be programmed to keep a watch on vehicle acceleration and to decide when and how an actuator may be controlled to avoid an overshoot.

In the case where an overshoot occurs and the vehicle speed is decremented until it is at or just below the preset speed limit, a microprocessor can advantageously be programmed to learn individual vehicle characteristics, e.g. due to differences in vehicle type, and/or due to differences in the load carried by the vehicle, and to exercise an optimum form of speed control. In such a case, the learning program can be effectively reset to an original state when, for example, the vehicle ignition is turned off. More particularly, the microprocessor may be conditioned to calculate vehicle speed (e.g. from a pulsed output derived from a vehicle speed transducer); to compare the calculated speed with a preset stored speed reference value in order to determine whether or not the vehicle speed has exceeded the preset speed value; and to decrement the stored reference value until any excess vehicle speed has been substantially reduced or eliminated.

The speed control device according to the second aspect of the invention may be used in the tachograph according to the first aspect of the invention to control either the maximum vehicle speed, or a driver selected top speed or both.

The vehicle speed control device according to the second aspect of the invention may alternatively be fitted to other forms of tachograph to provide a self-contained unit, e.g. with the aid of a microprocessor.

More generally, the above-mentioned aspects of the invention may be used either independently, or in combination. Moreover, a tachograph which embodies either, or both aspects of the invention may have any one or more of the various features mentioned above (as may be required).

Figure 4:
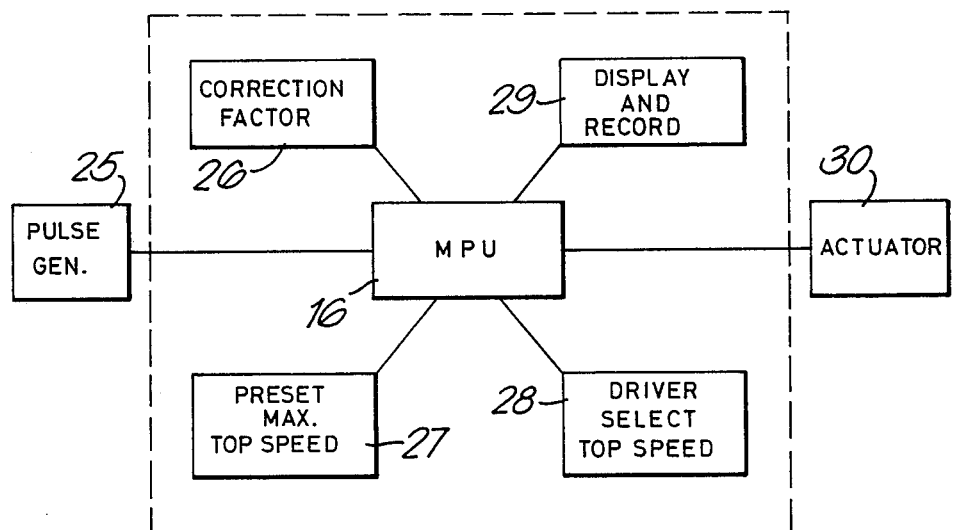
Figure 8:
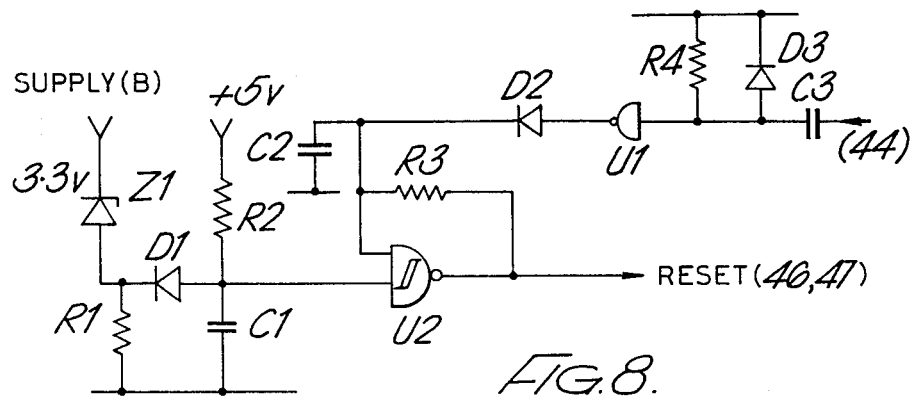
Figure 5:
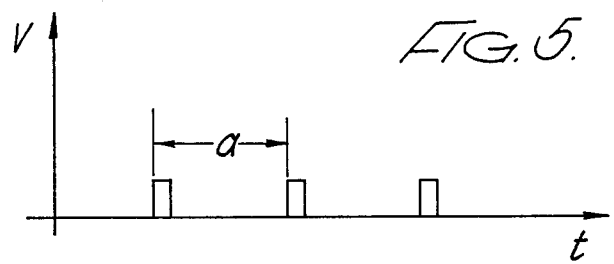
Figure 6:
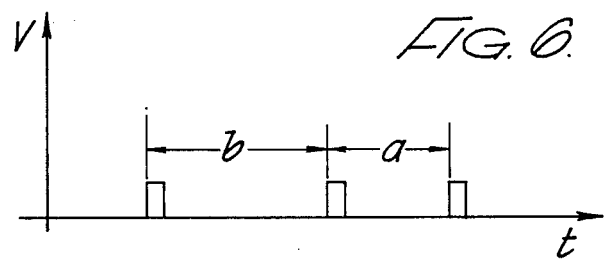
Figure 9:
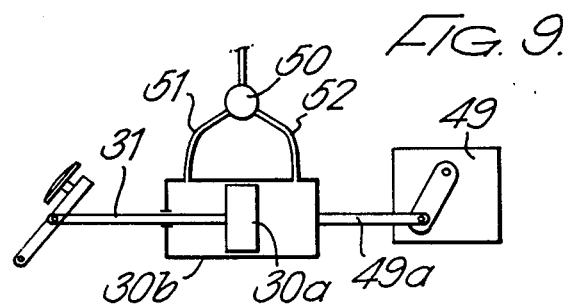
Figure 10:
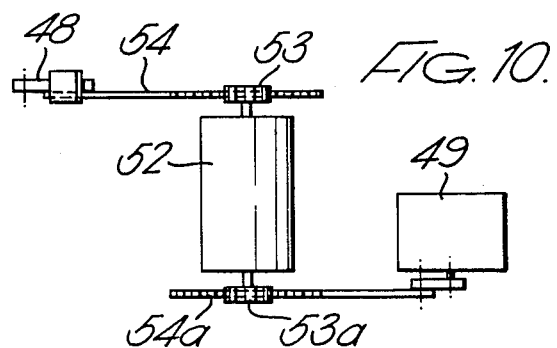
Figure 7:
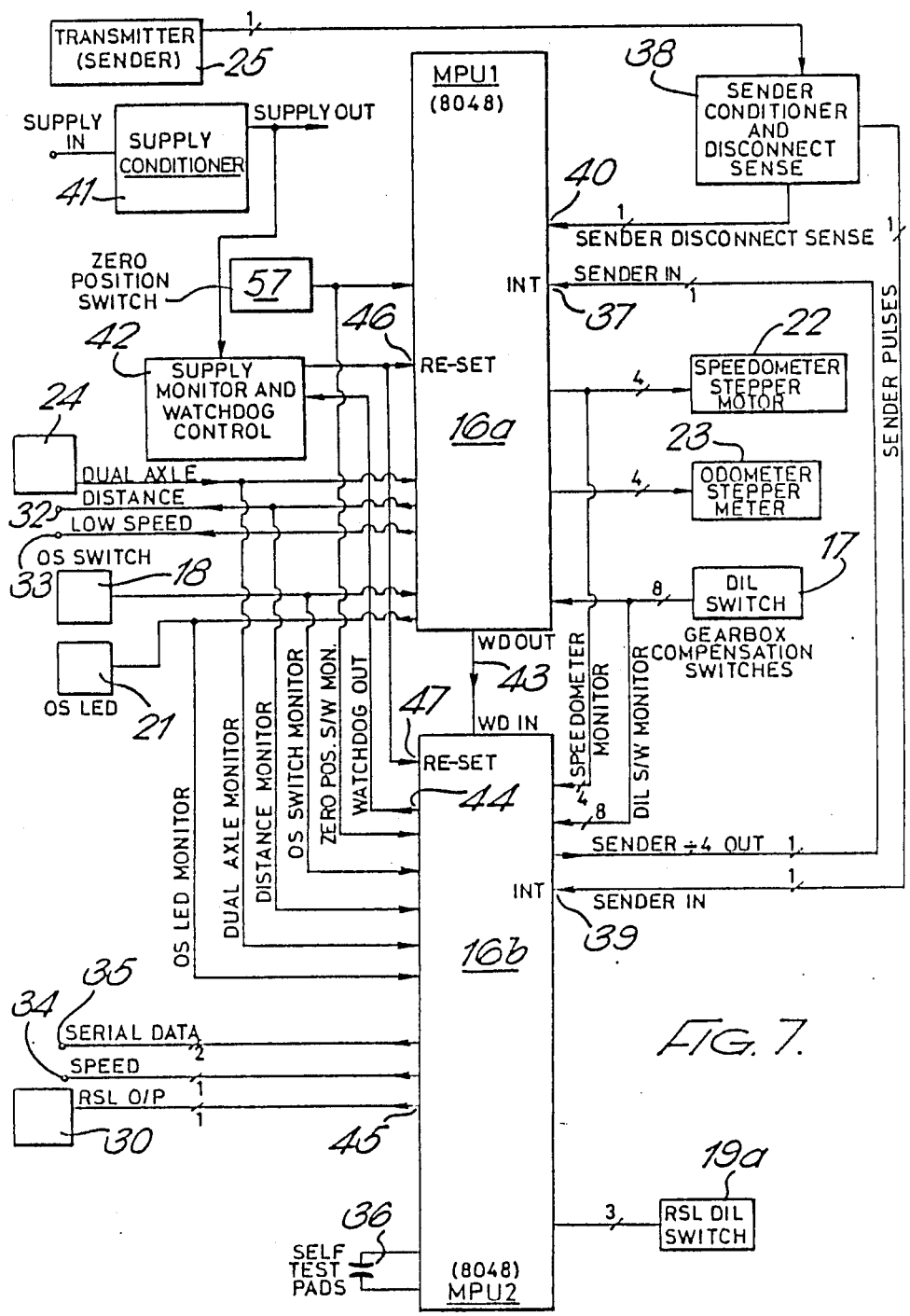
Figure 11:
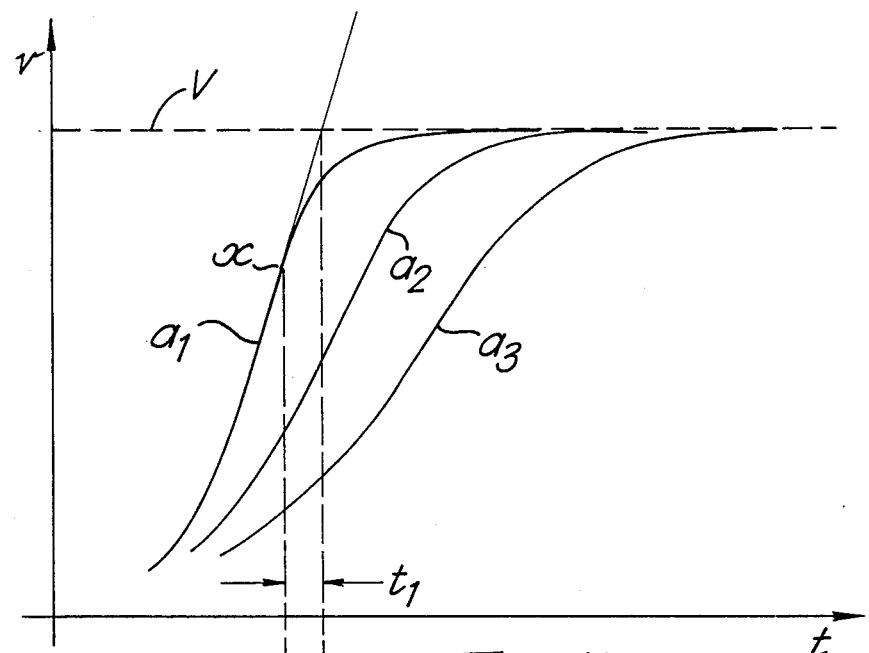
Figure 12:
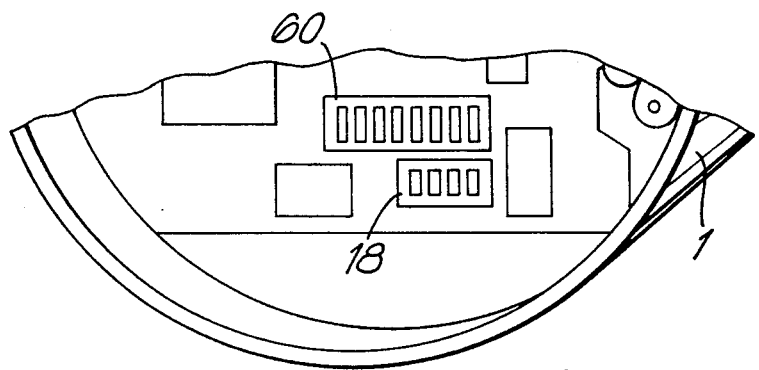

A preferred embodiment of the invention will now be described with reference to the accompanying schematic drawings, in which:

FIG. 1 is a simplified diagram showing the front of a tachograph,

FIG. 2 is a simplified perspective view illustrating respective stepper motor drives to vehicle speed display and recording mechanisms, and distance travelled display and recording mechanisms, FIG. 3 is a simplified diagram, in perspective, of the tachograph with its hinged cover opened, FIG. 4 is a simplified block diagram for illustrating the general system of control and operation used in the tachograph, FIGS. 5 and 6 are pulse diagrams, FIG. 7 is a more detailed block diagram of part of the system shown in FIGS. 1-3, FIG. 8 is a simplified circuit diagram of a supply monitor and watch-dog circuit used in the system of the tachograph, FIGS. 9 and 10 are diagrammatic views of other embodiments of the invention, and FIGS. 11 and 12 are respectively a graph and view of a part of the tachograph shown in FIG. 3 which both relate to a further embodiment of the invention.

Referring to FIGS. 1-3, a tachograph comprises a rear casing 1 having a hinged front casing 2 which acts as a front cover (the front casing 2 being shown in an open position in FIG. 2). A transparent window 3 is fitted to the face of the front casing 2 and through this window can be seen a vehicle speed indicator (pointer 4 and dial 5) and an odometer 6. For simplicity, only a vehicle speed indicator and an odometer are shown in FIGS. 1 and 2 and it should be understood that these Figures are simplified diagrams, since tachographs generally have other various features, such as clock faces, vehicle engine rpm indicators, and so on.

The rear casing 1 houses a turntable or chart drive on which a tachograph chart 7 is mounted for rotation; styli 8a, and 8b for recording respective vehicle speed and distance travelled traces 9 on the tachograph chart 7; and various components (mainly of known construction) which co-operate with the latter parts, in response to transducer pulse input signals, to cause appropriate traces 9 to be recorded on the chart 7. The chart drive includes locating pins 10 which engage corresponding holes 11 in the chart 7 and a central spigot 12 which engages a rotary drive member 20 coupled to the shaft of an electrical motor (not shown) housed in the rear casing 1. When the front casing 2 is in the open position (FIG. 3), a driver of the vehicle (in which the tachograph is fitted) can insert the chart 7 on the locating pins 10 and can remove the same after recording. Manually selectable controls 13 and 14, which are marked with the usual symbols to represent driver duties to be recorded, are accessible from the exterior of the casing 1 when the front casing 2 is in the closed position. The function of these controls is well known in the art so that no further explanation will be given. Moreover, it should be noted that FIG. 3 has been simplified to show only the speed and distance traces 9, in a schematic fashion, rather than the more usual and more detailed recordings that are associated with contemporary tachograph charts.

FIG. 2 shows schematically a stepper motor 22 which is coupled (a) through a step-down gear train 22a and shaft 22b to the speed indicating pointer 4, and (b) through a rack and pinion 22c to recording stylus 8a. Similarly, a stepper motor 23 is coupled (a) through a step-down gear train 23a and shaft 23b to odometer 6, and (b) through a cam and lever arrangement 23c to recording stylus 8b which is slidably mounted on a vertical guide 23d. The styli 8a and 8b respectively record the speed and distance traces 9 on the chart 7.

As shown in FIG. 3, the casing 1 houses a circuit board 15 on which are mounted various components. These components include one or more microprocessors 16 (see below), and 8-position DIL switch 17 to apply a gearbox compensation factor (see below), a 4-position DIL switch 18 for setting a "maximum vehicle speed" (switch 18 is preset by either the manufacturer, or a fitting centre where the tachograph is installed in a vehicle, this switch not being available for adjustment by the vehicle driver), a control e.g. including circuitry mounted on board 15 and operated by a push button 19 on front casing 2 to enable the driver to set a "driver selected top speed" (i.e. a speed below the maximum vehicle speed at which the vehicle is intended to cruise), and various other parts of the circuitry and structure.

The control system used in the tachograph is generally illustrated in FIG. 4. The system essentially comprises a microprocessor 16 which computes, e.g. vehicle speed and distance travelled on the basis of a pulse input which is proportional to the transmission drive speed of the vehicle and which has been corrected, for example, for the type of gearbox and rear axle fitted to the vehicle. The pulse input is provided by a pulse generator 25, the pulse repetition frequency or time interval a (FIG. 5) between consecutive pulses being proportional to vehicle speed. FIG. 6 indicates that the vehicle is accelerating since the time interval b is longer than a.

The microprocessor 16 executes (a) a vehicle speed control function, based on the computed vehicle speed, and (b) a display and recording function, based on the computed vehicle speed and distance travelled.

More specifically, the vehicle speed control function is executed by comparing the corrected vehicle speed input with the preset speed reference (e.g. either the "maximum vehicle speed" reference or the "driver selected top speed" reference) and by supplying an appropriate output, or outputs to an actuator 30 for adjusting the speed of the vehicle. Actuator 30 may be of known construction, for example, it may be a pneumatic or pneumatic/hydraulic piston and cylinder arrangement, 30a and 30b, as shown in FIG. 9, wherein a push rod 31 links a throttle pedal 48 to the piston 30b, and a push rod 49a links the cylinder 30b to an adjustable member of a fuel regulating device 49. Such an arrangement may be either single acting (e.g. where the piston reacts against a return spring), or double acting (as shown in FIG. 9). In the double acting arrangement of FIG. 9, compressed air is supplied to a valve 50 which is controlled by the microprocessor 16 so as to divert the air to either input 51, or input 52. This causes the piston to be respectively advance to decrease the length of the throttle linkage, or withdrawn to increase the length of the throttle linkage. The air pressure is then equalised on each side of piston 30a to provide a rigid link between the pedal 48 and the adjustable member of fuel regulating device 49. Thus, the piston normally floats at some intermediate point in a cylinder (e.g. with a throttle linkage of normal length), and the piston being driven either one way, or the other to reduce, or extend the throttle linkage and hence regulate the fuel supply to the engine of the vehicle.

A further alternative is to use a motor driven actuator in the throttle linkage to regulate maximum vehicle speed. FIG. 10 schematically illustrates an arrangement where pedal 48 is connected to a first pinion 53 by a rack 54. Pinion 53 is coupled by an intermediate motor drive 52 to a second pinion 53a. Pinion 53a engages a rack 54a connected to the adjusting member of fuel regulating device 49. Normally, pinions 53 and 53a rotate together, i.e. as if they were mounted on the same shaft. However, the intermediate motor drive 52 can rotate pinion 53a either clockwise, or anticlockwise (either continuously, or in steps) independently of pinion 53, i.e. under control of the microprocessor 16. This effectively shortens or lengthens the linkage between pedal 48 and the adjustable member of fuel regulating device 49. The pinions 53 and 53a subsequently rotate in unison to provide throttle control.

In a more simple arrangement, movement of the adjusting member of the fuel regulating device may be limited or regulated, e.g. either continuously or one step at a time, to limit the maximum amount of fuel supplied to the engine.

The arrangement which is used in practice will depend on the form of control required, e.g. to suit the vehicle characteristics, the terrain on which the vehicle is driven (especially where hills are present), the response (e.g. the time constant of the actuator) and the appropriate output or outputs available from the microprocessor 16.

In its simplest form, the microprocessor causes actuator 30 to remain energised (e.g. to vary the length of the throttle linkage by a predetermined amount) until the computed vehicle speed is equal to the preset speed reference and then the actuator 30 is de-energised. When the computed vehicle speed eventually falls below the preset speed reference, e.g. when the vehicle decelerates, the microprocessor energises the actuator so that it returns to its normal position (e.g. the length of the throttle linkage returns to normal).

The display and recording function (29) is executed by each of the stepper motors 22 and 23 as shown in FIG. 2. For example, a 4-phase stepper motor 22 is employed to drive both the speed indicating mechanism connected to pointer 4 and the speed recording mechanism connected to the corresponding stylus 8a. The microprocessor 16 positions the pointer 4 by directly controlling the phase sequencing the stepper motor windings. Stepper motor 23 drives the odometer mechanism 6 and the corresponding stylus 8b in the same manner.

FIG. 4 also illustrates means 27 for presetting a maximum vehicle speed and means 28 to enable a driver to select a top speed which is less than the maximum vehicle speed. The means 27 include the 4-position DIL switch 18 (FIG. 3) which is preset by the manufacturer or by a fitting centre where the tachograph is installed in a vehicle. The switch 18 is either isolated, or sealed in such a way that it is normally inaccessible to the driver. However, means 28 include the control 19 which enables the driver to set a top speed, e.g. for limiting the vehicle to a cruising speed which is less than the maximum legal speed at which the vehicle may travel. The control 19 may be in the form of a push button which is connected to circuitry which responds, when the button is pressed, to provide an instantaneous value which is used as a driver selected top speed reference. When the button is pressed again, this top speed reference is cancelled and the circuitry is reset to enable a different top speed reference to be selected. Hence, means 27 and 28 provide maximum speed and top speed reference inputs to the microprocessor 16.

The microprocessor 16 is also programmed to cause the indicator 21 (FIGS) 1-3) to be illuminated each time the driver selected top speed is reached, or exceeded.

As mentioned above, the microprocessor 16 computes the vehicle speed and distance travelled on the basis of a corrected pulse input. The 8-position DIL switch 17 enables adjustments to be made to provide a gearbox compensation factor to accommodate differences between vehicles, such as gearbox ratios, rear axle ratios, tire sizes, etc. When the vehicle is fitted with a dual axle transmission system, a switch 24 (FIG. 7) is used which changes state to indicate one or other selected rear axle ratio, thereby providing a further compensation factor. These two compensation factors are shown as a correction factor input 26 in FIG. 4.

The microprocessor 16 is programmed to scan continuously and sequentially the pulse generator input, the states of switches 17, 18 and 24 and the state of control 19 (which provide the correction factor, the maximum speed reference and the driver selected top speed reference), and the states of the stepper motors 22 and 23 (used in the display and recording function), and the state of the actuator 30 (for controlling means for regulating the vehicle speed). The scanning rate at which the data inputs are continually updated is such as to ensure smooth control of the vehicle.

Generally speaking, in order to control the speed of the vehicle so that it does not exceed the preset maximum (legal) speed, the microprocessor 16 continually compares the computed vehicle speed with the preset maximum speed reference and, when these two data inputs coincide, the microprocessor 16 supplies a control signal to the actuator 30, e.g. to adjust the length of the throttle linkage, so that further vehicle acceleration is inhibited. The vehicle will normally start to slow down as soon as the actuator 30 operates and when the true speed drops below the preset maximum speed reference, the microprocessor 16 will cause the actuator 30 to extend the throttle linkage to its normal length thereby allowing the vehicle to accelerate. Effectively, the state of the actuator 30 tends to oscillate about a mean position and the vehicle speed is kept constant within about ±1 km/hour.

A similar form of control is applied in order to cause the vehicle to travel at the driver selected top speed (as set by control 19).

The inertia of the vehicle is the main cause for the vehicle occasionally overshooting the preset speed reference and this is an inevitable effect due to the problem, facing any form of control system, of causing a heavy vehicle smoothly to approach and to maintain a given speed. To offset this, the microprocessor 16 is effectively programmed to learn the vehicle characteristics in practice (i.e. of the vehicle in which the tachograph is installed) and to apply this acquired knowledge so as to provide optimum vehicle speed control. As part of this learning process, the preset speed limit or reference (either 27 or 28 of FIG. 3) is stored as a data which can be effectively reduced in steps, or decremented, each time the computed speed is scanned and found to exceed the preset speed reference. For example, if on a first scan the computed speed exceeds the stored preset speed reference by 1 km/hour. If, on a subsequent scan, the computed speed again exceeds the predetermined speed limit by 1 km/hour or more, then the stored data is again decremented by 1 km/hour. This sequence continues until the computed vehicle speed is equal to or less than the predetermined speed limit.

The speed indicating mechanism (pointer 4) may need to be recalibrated after the power supply to the system is turned on, or in the event of an error. For example, the position of pointer 4 may either be unknown, or not precisely known. To overcome this problem, a microswitch 57 (FIG. 7) is fitted to the speed indicating mechanism so that the microswitch changes state when the pointer 4 is at its zero position. This switch state is used by the microprocessor 16 to recalibrate the setting of pointer 4 so that it accurately displays the computed speed of the vehicle.

With regard to resetting the microprocessor 16, a reset signal may conveniently be derived from the ignition of circuitry of the vehicle so that the system resets as soon as the ignition switch is turned on.

Turning now to FIGS. 7 and 8, a more detailed block diagram of part of the system shown in FIG. 4, together with a supply monitor and watch-dog circuit used in the system, will now be described. Similar reference numerals have been used to identify like components and, in this case, two microprocessors 16a and 16b are employed. Essentially, microprocessor 16a performs all the major functions, i.e. of calculation, vehicle speed control, display and recording, whilst microprocessor 16b provides additional features and, to a large extent, acts only as a monitor of signals generated by microprocessor 16a. Microprocessor 16b can be omitted where these additional features and monitoring are not required.

In addition to the functions described above, the arrangement shown in FIG. 7 can provide a "vehicle distance" pulse output on terminal 32 and a "low speed" output on terminal 33. The "distance pulse" output may be supplied to, e.g. a counter-operated switch which changes state each time the vehicle has covered a predetermined distance. Such a switch may operate, for example, a warning light, or some other indicator, to show that some attention is required to the lubrication system, or the braking system, or some other system of the vehicle. The "low speed" output may be supplied, for example, to a switch which changes state at a given preset speed of the vehicle. For example, where the tachograph is fitted to a bus where the doors can be opened by the passengers, the opening of the doors may be inhibited by the switch unless the bus is stationary. The switch may also be conditioned, e.g. in the case of a tip-up truck, so that it inhibits elevation of the truck body if the vehicle speed is more than say 8 kph, but enables the truck body to be elevated if the vehicle speed is 5 kph or less. The system also has a "serial data" output on terminal 35 and a "speed" pulse output on terminal 34. Terminal 34 provides serial data which is transmitted on two wires to external equipment such as an on-board vehicle computer and/or a magnetic tape or solid state data recorder. Such items are additional to the microprocessor 16 and the display and recording function 29 of the tachograph. Typical serial data to be transmitted includes:

(a) the position of the speed pointer 4,
(b) the setting of the DIL switches 17 and/or 18 (read by microprocessor 16b),
(c) the status of various input signals to microprocessor 16a (to which microprocessor 16b has access),
(d) a check sum, which can be used by external equipment to validate received data.

The "speed" pulse output on terminal 34 is provided for use by external equipment, each pulse being initiated by a corresponding pulse from the pulse generator 25, and the pulse width being a function of the correction factor 26, e.g. set by the gearbox compensation factor switch 17.

The circuit shown in FIG. 7 is also operable in a self-test mode, e.g. by bridging contacts 36 with a shorting bar whereby the self-test mode functionally tests almost all of the hardware of the tachograph.

Microprocessor 16a computes road speed and distance travelled as a function of (a) the period between consecutive pulses received on its INT input 37 (the pulse rate is directionally proportional to road speed), (b) the gearbox compensation factor as set by switch 17, and (c) the state of switch 24 which represents the rear axle ratio used on the vehicle. It also provides outputs to (a) the stepper motor 22, the output of which is coupled to both the speed indicating pointer 4 and the speed recording stylus 8a, and (b) the stepper motor 23, the output of which is coupled to both the odometer 6 and the distance travelled recording stylus 8b. The microswitch 57 closes when the pointer 4 is at its zero position and the switch state is used by microprocessor 16a to recalibrate the speed pointer position after the power supply is turned on, or after an error condition.

A sender conditioner and disconnect sensor 38 receives the output pulses from pulse generator 25. The unit 38 filters these pulses, to improve noise immunity, and supplies them to inpout 39 at microprocessor 16b. Microprocessor 16b divides the input pulse frequency by a given factor, e.g. 4 and supplies the pulse divided output to the INT input 37 of microprocessor 16a. The unit 38 will respond, if the pulse generator 25 is removed or if its lead is cut, so as to provide a "sender disconnect" signal on input 40 of microprocessor 16a. The microprocessor responds by causing the speed indicating pointer 4 to joggle, thereby indicating an error condition.

As the system employs digital techniques, it is inherently vulnerable to electrical noise. A "supply conditioning" circuit 41 removes supply-borne noise and prevents all but the severest "spikes" reaching the microprocessors 16a and 16b. To further improve the instrument's tolerance to noise, a "watch-dog" circuit 42 is incorporated and this uses discrete hardware to monitor the microprocessors 16a, 16b for correct operation. If a fault is detected, both microprocessors are stopped and re-initialised. Microprocessors 16a and 16b employ various techniques to validate both their data and program execution. Provided all tests prove negative, the "watch-dog" is held "off" by pulsing a watch-dog output line 43. To minimise external circuitry, "watch-dog" pulses are routed, via output 44 of microprocessor 16b, to the "watch-dog" circuitry 42. A failure of either microprocessor will result in the "watch-dog" being invoked.

Microprocessor 16b infers vehicle speed by monitoring the phase changes on stepper motor 22 (which is driven by microprocessor 16a and which is coupled to both the speed indicating pointer 4 and the speed recording stylus 8a). During power-up, microprocessor 16b reads the status of the self-test pads 36 and, if shorted, the self-test mode is activated. This mode only affects microprocessor 16b, since microprocessor 16a functions as normal. Microprocessor 16b "fools" microprocessor 16a into displaying road speed, etc., by generating pseudo-transmitter pulses (as if they were from generator 25), and in this way microprocessor 16b exercises the major tachograph functions performed by microprocessor 16a.

Switch 18 provides a maximum speed reference input to microprocessor 16a, and control 19a (which incorprates push button 19) provides a driver selected top speed reference to microprocessor 16b. Control 19a may incorporate a switch having 8 possible settings, e.g. corresponding with speeds at increments of 10 kph in the range 50-120 kph. These settings may be selected by the driver, e.g. with the aid of an indicating switch. Alternatively, and as mentioned above, the push button 19 is depressed to provide an instantaneous top speed reference and is pressed again to cancel the same.

Output 45 provides a speed control signal to the actuator 30 as a result of exceeding either the maximum speed reference or the driver selected top speed reference. In either case, vehicle speed overshoot may be controlled by continuously decrementing the effective speed reference, e.g. by 1 kph each time the computed vehicle speed exceeds the speed reference by more than 1 kph. The microprocessor 16b is programmed to perform such decrementing.

Actuator 30 may comprise a solenoid valve, since the signal from output 45 has sufficient current sink capability (1 amp max.) to operate most solenoid valves. To accommodate different actuator mechanisms, a link option can be provided on the logic board 15 to enable the sense of the output signal to be changed.

FIG. 8 illustrates the circuitry of the supply monitor and watch-dog unit 42 in more detail. Discrete hardware implements the dual function of supply level monitoring and watch-dog controller. The supply monitor ensures that the microprocessors 16a, 16b are only allowed to run when the electrical supply to the tachograph is within predetermined limits and has had time to stabilise. The watch-dog is concerned with monitoring the microprocessors for correct operation and for initiating an error recovery sequence in the event of a microprocessor failure. The circuitry shown in FIG. 8 has the following functions;

(a) a reset timer (to ensure an adequate reset pulse for the microprocessors),
(b) supply monitor (to hold the microprocessors in their reset state if the supply voltage falls below e.g. approximately 8.5 volts), and
(c) watch-dog monitor (which forces both microprocessors into their reset state if their watch-dog pulses should stop).

Zener diode Z1, resistor R1, diode D1, capacitor C1 and resistor R2 form the supply monitor. When the supply voltage is low (e.g. less than 3.3 volts), diode D1 becomes forward biased and current flows through R2, D1 and R1. As R1 is smaller than R2, the potential on C1 is low. A low on the input of NAND gate U2 forces its output to go high, thereby holding the reset line, connected to its output, in its inactive state. As the supply (B) starts to rise, zener diode Z1 will eventually start to conduct and pull up the potential on the cathode of diode D1. This results in a corresponding rise in the input of NAND gate U2. As the supply (b) exceeds approximately 8.5 volts, the input to U2 will have risen sufficiently to release the reset line. The time constant formed by R2 and C1 ensures an adequate delay in releasing the reset line if the supply (B) should rise sharply. U2, C2 and R3 form a slow-running Schmitt oscillator.

In the absence of watch-dog pulses, the output of gate U1 is held low. Diode D2 is therefore permanently reverse biased. U2 oscillates, raising and lowering the microprocessors' reset lines. Each time the microprocessors are released, they should start to output watch-dog pulses to C3. After differentiation by R4 and C3, these pulses will appear on the output of U1. Each time the output U1 swings high, D2 becomes forward biased and dumps charge into C2. C2 is pumped up until it sits permanently high, preventing further oscillation of U1. If either microprocessor detects an internal error, its respective watch-dog ouput goes inactive. U1 starts on its first cycle of oscillation and re-initialises both microprocessors.

The watch-dog pulse input of the circuit of FIG. 8 is derived from output 44 of microprocessor 16b. The reset output of the circuit of FIG. 5 is applied to the respective inputs 44, 46 of the microprocessors 16b, 16a.

By way of an alternative to decrementing preset speed reference data whenever the vehicle speed exceeds the preset speed, the microprocessor 16 may be conditioned to control the actuator 30 so that effectively causes the vehicle speed to approach the preset speed in an optimum asymptotic manner. For example, this may be achieved by programming the microprocessor so that it is aware that the vehicle speed is approaching near to the preset speed and so that it provides an appropriate output for controlling an actuator which operates so as to reduce the vehicle speed in sufficient time to avoid overshooting the speed limit. A potential overshoot may be predicted with regard to the acceleration of the vehicle at a given instantaneous speed. The instantaneous speed can be derived from the frequency of the pulses as mentioned above with reference to FIG. 5 and the acceleration of the vehicle can be deduced from the interval between pulses as mentioned with reference to FIG. 6 (e.g. a reduction in the interval between pulses, where b is greater than a, means that the vehicle is accelerating). Thus, the difference between concurrent intervals is a measure of vehicle acceleration and this can be used, together with a measure of instantaneous speed, for proportionally adjusting the movement of the actuator 30 so that the vehicle smoothly approaches, but does not exceed the preset speed limit. In this case, the actuator 30 may be controlled in a continuous manner, e.g. by continuously adjusting the extent of the throttle linkage (e.g. by means of the arrangement shown in FIGS. 9 or 10), rather than making such adjustments in a stepped manner. However, stepped adjustment is also feasible, e.g. where a larger number of smaller steps are employed.

Instead of deducing vehicle acceleration from the pulse interval (shown in FIG. 6), it may be computed by differentiating the pulse frequency. More particularly, the pulse output of pulse generator 25 (FIG. 4) provides a signal having a frequency proportional to vehicle speed, and this signal is differentiated (e.g. by a differentiating circuit or by a suitably programmed microprocessor) to provide data which is proportional to vehicle acceleration. FIG. 11 is a plot of vehicle speed v against t and it shows three traces $a_1$–$a_3$ which represent three different rates of acceleration (the slope of the trace being proportional to acceleration). Considering trace $a_1$, the vehicle is accelerating smoothly (over the straight line portion) towards a preset speed limit V. At regular instants of time, e.g. above a predetermined speed threshold, the microprocessor 16 computes the predicted time required for the vehicle to attain the preset speed V based on data representing instantaneously computed values of vehicle speed and acceleration. These predicted times will vary according to the acceleration of the vehicle (e.g. they will be longer for acceleration $a_3$ than either $a_2$ or $a_1$). Moreover, the acceleration of the vehicle will depend on the load carried and hence the vehicle speed can be advantageously controlled, with respect to different loads, to avoid exceeding a preset speed limit.

The predicted times are continuously compared with a selected reference value which is stored in the memory of the microprocessing system. This reference value is proportional to the response time, or time constant, of the actuator 30 or the system as a whole (e.g. particularly where the actuator has a fast response) by means of which the supply of fuel to the vehicle engine is adjusted or regulated for controlling vehicle speed. For example, where the extent of the throttle linkage is adjusted to control vehicle speed, there will be a finite delay before the extent of the linkage has been adjusted and has taken effect on vehicle speed.

Preferably, the microprocessor is provided with a look-up table containing data relating to vehicle speed, vehicle acceleration and actuator or system response time so that an optimum control function can be provided in accordance with the appropriate input parameters.

In any such arrangements, the control function executed by the microprocessor is designed to cause the actuator to reduce vehicle speed on approaching the preset speed limit and to return the actuator to an original or starting position when the vehicle decelerates. During acceleration, the speed is reduced to a point which allows the actuator sufficient time to effect a reduction in vehicle speed so that the speed smoothly and assymptotically approaches the preset speed limit V without any significant overshoot. For example, at point x on trace $a_1$, a predicted time $t_1$ is computed or provided from the look-up table to reach speed limit V. This is equivalent to extending the slope of $a_1$ to intersect the broken line representing limit V. If $t_1$ is substantially equal to the response time of the actuator 30, then microprocessor 16 provides an output to actuator 30 which causes the vehicle speed to be limited smoothly to the preset limit V.

As different vehicles and/or different actuators will respond within different time intervals, the tachograph 1 is preferably equipped with means for selecting different preset response times. These response times may be incorporated in the look-up table mentioned above, or means may be provided in the tachograph assembly for selecting different response times. In the latter respect, FIG. 12 schematically illustrates a modification to tachograph 1 where an additional bank of 8 DIL switches 60 are provided, one of these switches being selected to suit the characteristics of the vehicle. The switches 60 are not normally accessible to the driver, since they would be preselected by a manufacturer, or at a motor depot to suit a particular vehicle.

With general regard to the form of control which is provided by the microprocessor 16, it will be understood that any conventional devices which are necessary or desirable for executing the display and control functions are provided, for example, a clock, ROM, RAM and I/O interfaces. Moreover, the microprocessor program is also adapted for any necessary conversion of analogue inputs to digital data, or digital data to analogue outputs. This applies, for example, to the switches 17, 18 and 24, the control 19, and the monitoring of the phases of the stepper motors 22 and 23. In the case of control 19 being in the form of a push button which is pressed to provide an instantaneous driver selected top speed reference, depression of the button may cause the microprocessor 16 to scan the stepping phase of stepper motor 22 and to convert the instantaneous analogue signal into a digital data value which is stored in a register. The speed reference (either maximum or driver selected) can be stored in a register whereby it can be decremented, e.g. as a result of effectively comparing vehicle speed with the preset speed reference and subtracting a predetermined digital value from the contents of the register whenever the vehicle speed exceeds the preset speed reference (i.e. after each scan as mentioned above). As those skilled in the art will be familiar with microprocessing techniques, no further detailed description will be given.

In the embodiment described above with reference to FIG. 7, i.e. where microprocessors 16a and 16b are used, the functions provided by these microprocessors may alternatively be carried out by a single microprocessor.

Whilst different embodiments of the invention have been described above, various modifications, changes and different combinations of features may be made without departing from the scope of the invention defined by the appended claims.

We claim:

1. In a vehicle speed control device comprising means to provide a preset vehicle speed reference corresponding with a predetermined vehicle speed limit; input means for receiving an instantaneous vehicle speed input signal; and control means which responds to said instantaneous vehicle speed input signal and to said preset vehicle speed reference, whenever the instantaneous vehicle speed exceeds said vehicle speed limit, and which performs a vehicle speed control function and thereby produces a speed control output for reducing the vehicle speed; the improvement wherein said control means includes storage means for storing said preset vehicle speed reference as an initial data value of a floating speed reference, means for continuously and sequentially scanning said storage means and a current instantaneous vehicle speed signal, for determining, after each scan, whether or not the current instantaneous vehicle speed exceeds said predetermined speed limit, and for decrementing the stored data value by a predetermined amount whenever the current instantaneous vehicle speed is found to exceed said predetermined speed limit whereby said stored data value is reduced in steps in order to reduce said data value until the amount by which the current instantaneous vehicle speed exceeds said predetermined vehicle speed limit is substantially reduced or eliminated, said reduced data value providing a new effective speed reference to which said control means responds.

2. A device according to claim 1 wherein said predetermined amount by which the stored value is decremented is proportional to the amount by which the current instantaneous vehicle speed exceeds said predetermined vehicle speed limit.

3. A tachograph including a casing; a tachograph chart drive within the casing; a visible vehicle speed indicator mounted on or within the casing; manually selectable controls accessible from the exterior of the casing for selecting driver duties to be recorded by the tachograph; recording means for recording said driver duties together with vehicle speed and distance travelled by a vehicle; a microprocessor mounted within the casing and having an input for receiving a speed signal proportional to instantaneous vehicle speed and an input for receiving a vehicle transmission signal related to the transmission characteristics of the vehicle; and an adjustable control for providing a preset speed reference which relates to a predetermined vehicle speed limit; said microprocessor being programmed to provide a vehicle speed control function when the instantaneous vehicle speed exceeds the predetermined vehicle speed limit and thereby to produce a speed control output for reducing the vehicle speed, said control function being executed by the steps of (i) storing the preset speed reference as an initial stored data value of a floating speed reference, (ii) continuously and sequentially scanning said stored data value and the speed signal proportional to a current instantaneous vehicle speed, (iii) determining, after each scan, whether or not the current instantaneous vehicle speed exceeds said predetermined vehicle speed limit, (iv) decrementing the stored data value by a predetermined amount whenever the current instantaneous vehicle speed is found to exceed said predetermined vehicle speed limit, (v) repeating step (ii)–(iv) so that said stored data value is reduced in steps in order to reduce said data value until the amount by which the current instantaneous vehicle speed exceeds said predetermined vehicle speed limit is substantially reduced or eliminated; said microprocessor being programmed to process the speed signal and the vehicle transmission signal and thereby to provide a drive output for driving said recording means whereby said vehicle speed and distance travelled are recorded by the tachograph.

4. A tachograph according to claim 3 wherein said predetermined amount by which the stored value is decremented is proportional to the amount by which the current instantaneous vehicle speed exceeds said vehicle speed limit.

5. A tachograph according to claim 3 including means for indicating said distance travelled by the vehicle, respective stepper motors for driving (a) the vehicle speed indicator, (b) the means for indicating said distance travelled and (c) parts of said recording means which respectively record the speed and the distance travelled by the vehicle, said stepper motors being controlled by the microprocessor.

6. A tachograph according to claim 3 wherein the vehicle speed control function is reset to an original state when a vehicle ignition is operated.

* * * * *